(12) United States Patent
Duke et al.

(10) Patent No.: US 7,134,671 B2
(45) Date of Patent: Nov. 14, 2006

(54) LIP SEAL HAVING INCREASED CONTACT FORCE AT INTERFACE AND APPARATUS INCORPORATING THE SAME

(75) Inventors: J. Thomas Duke, West Valley City, UT (US); A. Todd Hagen, West Valley City, UT (US)

(73) Assignee: Macrotech Polyseal, Inc., Salt Lake City, UT (US)

( * ) Notice: Subject to any disclaimer, the term of this patent is extended or adjusted under 35 U.S.C. 154(b) by 0 days.

(21) Appl. No.: 10/327,258

(22) Filed: Dec. 20, 2002

(65) Prior Publication Data

US 2004/0119244 A1    Jun. 24, 2004

(51) Int. Cl.
*F16J 15/32* (2006.01)

(52) U.S. Cl. .................. 277/560; 277/549; 277/647

(58) Field of Classification Search ............ 277/560, 277/562, 549, 644, 647, 648
See application file for complete search history.

(56) References Cited

U.S. PATENT DOCUMENTS

| | | | | |
|---|---|---|---|---|
| 3,214,179 | A | * | 10/1965 | Dega .................... 277/309 |
| 3,504,920 | A | | 4/1970 | Halliday |
| 3,921,987 | A | | 11/1975 | Johnston et al. |
| 3,923,315 | A | | 12/1975 | Hadaway |
| 4,061,346 | A | * | 12/1977 | Coleman et al. ........ 277/439 |
| 4,421,322 | A | | 12/1983 | Ruch et al. |
| 4,464,322 | A | * | 8/1984 | Butler .................. 264/138 |
| 4,822,058 | A | | 4/1989 | Butler et al. |
| 4,889,351 | A | | 12/1989 | Frost |
| 4,964,647 | A | | 10/1990 | Stephan |
| 5,083,802 | A | | 1/1992 | Shimasaki et al. |
| 5,127,661 | A | * | 7/1992 | Franson et al. ........ 277/552 |
| 5,143,385 | A | * | 9/1992 | Sponagel et al. ....... 277/559 |
| 5,711,534 | A | | 1/1998 | Bengoa et al. |
| 6,045,138 | A | * | 4/2000 | Kanzaki ............... 277/562 |
| 6,105,968 | A | | 8/2000 | Yeh et al. |
| 6,189,894 | B1 | * | 2/2001 | Wheeler ............... 277/549 |
| 6,209,882 | B1 | * | 4/2001 | Riess .................. 277/562 |
| 6,357,757 | B1 | * | 3/2002 | Hibbler et al. ......... 277/551 |

(Continued)

FOREIGN PATENT DOCUMENTS

DE    10120403    * 12/2002

(Continued)

OTHER PUBLICATIONS

English Translation of Published German Patent Application DE 101 204 03 A1, published Dec. 19, 2002.

*Primary Examiner*—William L. Miller
(74) *Attorney, Agent, or Firm*—TraskBritt (57) ABSTRACT

A seal having a body portion, at least one lip portion extending from the body portion, and a protrusion formed on the at least one lip portion. The lip portion and protrusion formed thereon may each include an arcuate segment wherein the arcuate segment of the protrusion exhibits a smaller radius than the arcuate segment of the lip portion. The protrusion further includes a surface or a segment adjoining its arcuate segment on the intended fluid or upstream side of the seal. The segment of the protrusion on the intended fluid side may be configured to be substantially perpendicular with the surface of a machine element with which it comes in contact. The configuration and orientation of the protrusion enables the seal to apply an increased contact force over a reduced area, improving penetration of any fluidic film formed on the surface of the machine element and thereby reducing leakage.

35 Claims, 4 Drawing Sheets

U.S. PATENT DOCUMENTS

| | | | |
|---|---|---|---|
| 6,511,075 B1 * | 1/2003 | Schmidt | 277/436 |
| 6,520,507 B1 * | 2/2003 | Pataille et al. | 277/561 |
| 6,543,783 B1 * | 4/2003 | Freitag et al. | 277/436 |
| 2002/0003337 A1 | 1/2002 | Yamada et al. | |
| 2003/0030227 A1 * | 2/2003 | Mohr | 277/549 |

FOREIGN PATENT DOCUMENTS

| EP | 0 031 232 B1 | 4/1985 |
|---|---|---|

* cited by examiner

LIP SEAL HAVING INCREASED CONTACT FORCE AT INTERFACE AND APPARATUS INCORPORATING THE SAME

BACKGROUND OF THE INVENTION

1. Field of the Invention

The present invention relates generally to seals and, more particularly, to lip-type seals having increased contact force at the interface of the seal and the component it contacts in sealing a first area from a second area.

2. State of the Art

Seals are conventionally used in maintaining a substance, such as a fluid or gas, located in one area or zone from escaping to another area or zone while allowing relative movement of two or more mechanical components with one of the mechanical components traversing through both areas or zones. Such seals may also be used in keeping contaminants, such as dirt, dust or other particulate-type materials, from entering into a specified area or zone. For example, it may be desirable to maintain a lubricant in a specified area or zone while keeping dust or other particulates from entering into the same zone and contaminating the lubricant.

As will be appreciated by those of ordinary skill in the art, the ability to maintain adequate lubrication between two relatively movable machine components, as well as the ability to limit contaminants from entering between the two relatively movable machine components, greatly enhances the working efficiency of the machine components and also greatly reduces wear of such components, thereby increasing the usable life thereof.

Figure 1A:
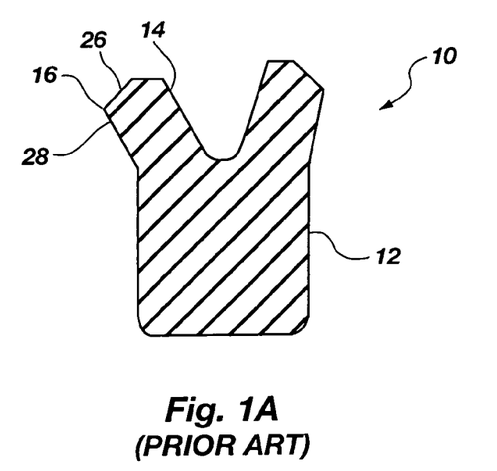
FIGS. 1A and 1B show cross-sectional views of an exemplary prior art lip-type seal.
Figure 1B:
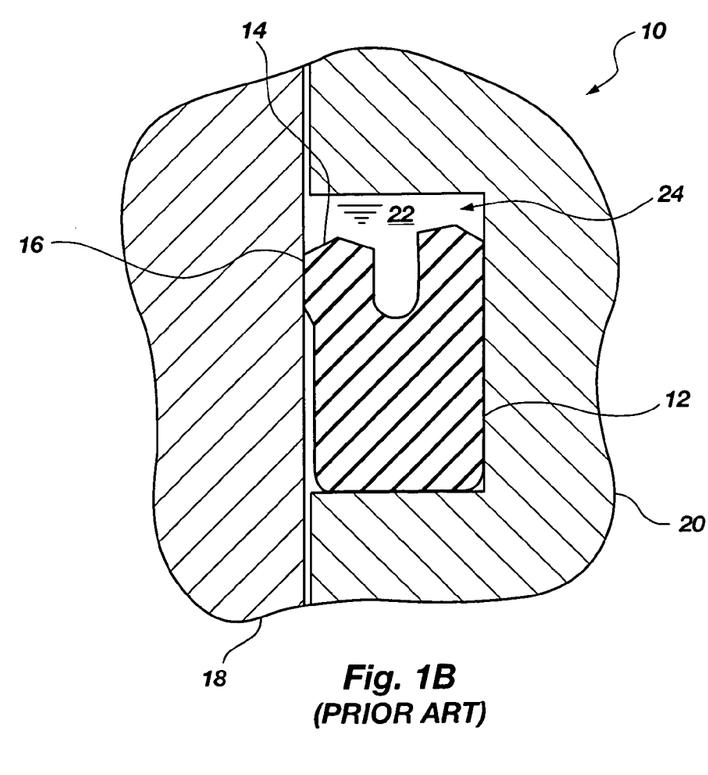

Referring to FIG. 1A, a cross-sectional view of an exemplary prior art lip-type seal 10 is shown. The seal 10 includes a body portion 12 and a flared lip portion 14. As shown in FIG. 1B, an external cornice 16 of the flared lip portion 14 is configured to act as a contact surface in forming a seal between two relatively movable machine components 18 and 20. In the exemplary embodiment shown, the seal 10 is configured to maintain a volume of fluid 22 in a zone 24 located between the two relatively movable machine components 18 and 20.

The two relatively movable machine components 18 and 20 may be representative of various devices. For example, the first machine component 18 may be a shaft of a hydraulic cylinder wherein the first machine component 18 reciprocates axially relative to the second machine component 20. Another example may include a bearing assembly wherein the first machine component 18 rotates or moves radially relative the second machine component 20. Numerous other devices may incorporate a seal 10, with most configurations generally including the basic motions of relative rotation and/or relative axial movement between the machine components 18 and 20.

In the case wherein the first machine component 18 moves axially relative to the second machine component 20, for example, it may be desirable to pierce a fluid film (not shown) which develops on the surface of the first machine component 18 in order to provide an effective seal between the two machine components 18 and 20. Such may be accomplished by providing a force at the contact surface of the seal 10 (e.g., the cornice 16) which is sufficient to break the surface tension of the fluid film. Due to conventional tooling and manufacturing limitations, the cornice 16 of the lip portion 14 of the seal 10 conventionally exhibits a radius which acts to distribute any force applied to surface of the first machine component 18 over a larger area by increasing the area of contact therebetween. If a given contact force is distributed over a greater area of contact between the cornice 16 and the first machine component 18, it becomes more difficult to effectively pierce the fluid film formed on the first machine component 18.

Furthermore, while it might seem desirable to provide a cornice 16 with a very small radius (e.g., approaching a point contact) various problems prevent the use of a small radius or pointed cornice. For example, as noted before, due to conventional tooling and manufacturing constraints, it becomes difficult to provide a cornice 16 or contact surface with a sufficiently small radius, particularly in large-scale production where accurate reproducibility of parts is required. For example, it is believed that, due to conventional tooling constraints, it is difficult to consistently and accurately reproduce the cornice 16 or similar contact surface with a radius less than approximately 4 mils (0.004 inch) in large-scale production.

Additionally, in an effort to resist undue deformation of the lip 14 and cornice 16 under loaded conditions, in which undue deformation may occur, for example, during relative axial movement between the seal 10 and the first machine component 18, the two surfaces 26 and 28 which lead up to the cornice 16 are conventionally located and configured to define an obtuse angle therebetween. Such a configuration, while providing adequate resistance against undue deformation of the lip 14, results in a less-than-optimal interface angle between the upstream surface 26 of the lip 14 and the surface of the first machine component 18 and, thus, may not be entirely effective in piercing the fluid film formed on the surface of the first machine component 18.

In view of the shortcomings in the art, it would be advantageous to provide a lip seal which provides increased contact force at its interface with a relatively moving machine component while possibly reducing the area of contact between the seal and the relatively moving machine component. It would further be advantageous to provide such a seal wherein a reduced-radius contact surface may be formed at a desired interface angle with respect to the relatively moving machine component while providing stability for such a contact surface.

BRIEF SUMMARY OF THE INVENTION

In accordance with one aspect of the invention, a seal is provided. The seal includes a substantially annular body portion and a substantially annular lip portion extending from the body portion. The lip portion includes an arcuate segment which exhibits a first radius. A substantially annular protrusion is formed on the lip portion and includes an arcuate segment which exhibits a second radius which is less than the first radius.

In accordance with another aspect of the invention, another seal is provided. The seal includes a substantially annular body portion and a substantially annular lip portion extending from the body portion. The lip portion includes a first segment and a second segment joined by an arcuate segment. A substantially annular protrusion is formed on the lip portion, the protrusion including a first segment joined with an arcuate segment. The first segment of the protrusion is configured to be substantially perpendicular to the second segment of the lip portion. The protrusion may also include a second segment joined with the arcuate segment thereof and located adjacent the second segment of the lip portion. The second segment of the protrusion may be oriented at an acute angle relative to the second segment of the lip portion.

In accordance with another aspect of the invention, an apparatus is provided including first and second relatively movable machine elements wherein one of the inventive seals is disposed therebetween and in contact therewith.

In accordance with yet another aspect of the present invention, a method of forming a seal between a first machine element and a second, relatively movable machine element is provided. The method includes providing a sealing member having a body portion and a lip portion extending from the body portion having a first segment, a second segment and an arcuate segment positioned between and adjoining the first and second segments of the lip portion. The seal also has a protrusion formed on the lip portion, wherein the protrusion has a first segment adjoined with an arcuate segment. The sealing member is disposed between the first machine element and the second machine element so as to contact a surface of the first machine element with the protrusion such that the first segment of the protrusion is substantially perpendicular with the surface of the first machine element. The first machine element is moved relative to the sealing member while contact is maintained therebetween so as to wear a substantial volume of the protrusion away, thereby leaving a ridge segment between the second segment of the lip portion and the arcuate segment of the lip portion, which is substantially perpendicular to the surface of the first machine element.

BRIEF DESCRIPTION OF THE SEVERAL VIEWS OF THE DRAWINGS

The foregoing and other advantages of the invention will become apparent upon reading the following detailed description and upon reference to the drawings in which.

DETAILED DESCRIPTION OF THE INVENTION

Figure 2A:
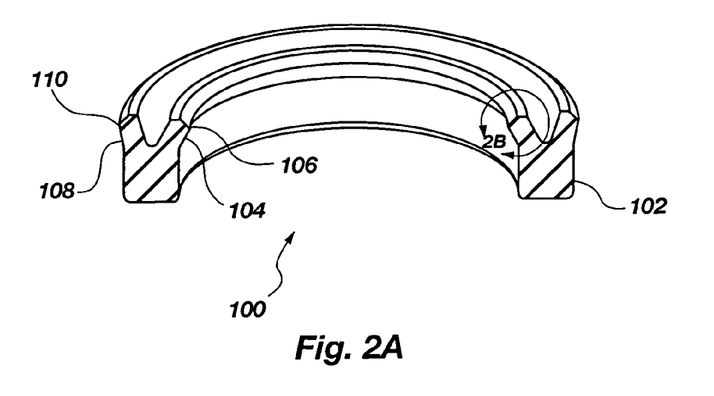
FIG. 2A is a perspective view of a sectioned portion of a lip-type seal according to an embodiment of the present invention.

Referring to FIG. 2A, an exemplary lip-type seal 100 is shown. The seal 100 is shown in perspective view and is sectioned such that only approximately half of the seal 100 is shown. In actual use, the seal 100 is configured as a substantially annular member, as will be appreciated by those of ordinary skill in the art. The seal 100 includes a body portion 102. A first lip portion 104 extends from the body portion 102 and flares radially inwardly relative to the body portion 102 to define an inner periphery 106 of the seal 100. A second lip portion 108 extends from the body portion 102 and flares radially outwardly relative to the body portion 102 to define an outer periphery 110 of the seal 100. It will be noted that other seal configurations may be used, including some which are illustrated and described below.

The seal 100 is desirably formed as a unitary member such that the first and second lip portions 104 and 108 are contiguous and integral with the body portion 102. The seal 100 may be formed of any of various materials including, for example, polyurethane, nitrile rubber (NBR), neoprene, silicone or other suitable elastomers.

Figure 2B:
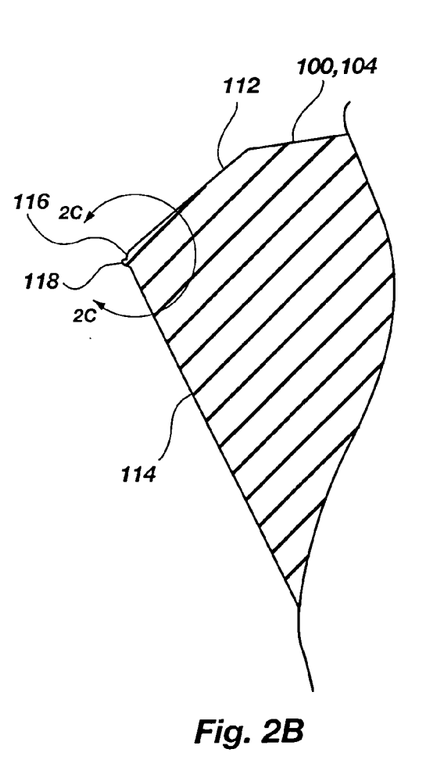
FIG. 2B is an enlarged sectional view of a lip portion of the seal of FIG. 2A.

Referring now to FIG. 2B, an enlarged cross-sectional view of the first lip portion 104 is shown depicting the profile thereof. It is noted that the features and construction of the first lip portion 104 may be applicable to the second lip portion 108 as well. However, it is contemplated that the features disclosed in conjunction with the first lip portion 104 hereinbelow provide a particular advantage when formed on a lip portion which is intended to be placed against the surface of a machine element which is moving relative to the seal 100.

The first lip portion 104 includes a first surface or segment 112 which is intended to be on the fluid or upstream side of a seal formed between two relatively moving machine elements. A second surface or segment 114 of the first lip portion 104 is located on what is intended to be the nonfluid or downstream side of the seal formed between two relatively moving machine elements. An arcuate surface or segment 116 having a relatively fine radius may be located between, and serve as a transition between, the first and second segments 112 and 114. A small protrusion 118 extends from first the lip portion 104 and is located generally in the area where the second segment 114 transitions to the first segment 112 such as adjacent to, or even contiguous with, the arcuate segment 116.

It is noted that while the exemplary embodiment includes a transitional arcuate segment 116, the first and second segments 112 and 114 could transition by meeting and forming a corner or angle therebetween. In such a case, the protrusion 118 could be formed along the second segment 114 and displaced, for example, approximately 0.002 to 0.020 of an inch from the angular transition.

Figure 2C:
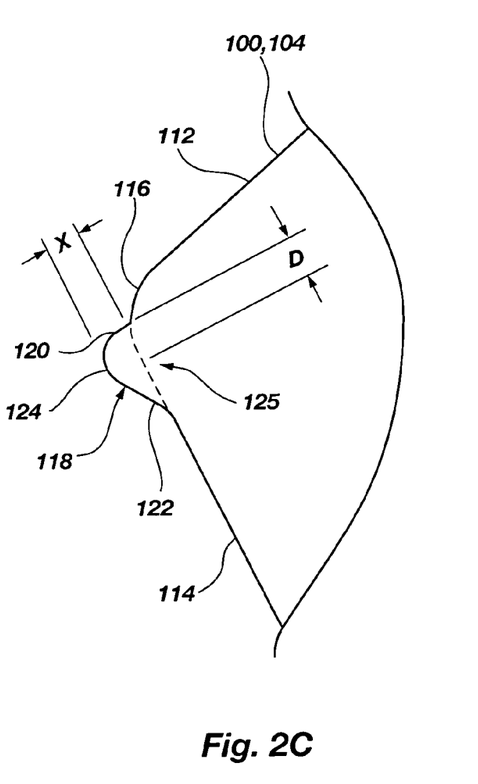
FIG. 2C is a further enlarged view of a portion of a lip seal as indicated in FIG. 2B.

Referring to FIG. 2C, a further enlargement of the first lip portion 104, including the protrusion 118, is shown. It is noted that the cross section of the first lip portion 104 shown in FIG. 2C is not cross-hatched for purposes of clarity.

As set forth above, the protrusion 118 may be located generally along the projected transition of the arcuate segment 116 with the second segment 114. The protrusion 118 also includes a first surface or segment 120 on the intended fluid side of a seal formed between two relatively moving machine elements, a second surface or segment 122 located on the intended nonfluid side of the seal, and an arcuate surface or segment 124 located between and joining the first and second segments 120 and 122 of the protrusion 118. As will be appreciated by those of ordinary skill in the art, due to practical considerations regarding tooling, it becomes difficult to form a transition between any two nonparallel surfaces (e.g., the first and second segments 120 and 122 of the protrusion 118) as a true angle and without a radius at any significant level of mass production.

The arcuate segment 124 of the protrusion 118 exhibits a radius which is desirably smaller than the arcuate segment 116 of the first lip portion 104. For example, the arcuate segment 116 may exhibit a radius which may be as small as 4 mils (0.004 inch) while the arcuate segment 124 of the protrusion 118 may, for example, exhibit a radius of approximately 0.75 to 1.5 mils (0.00075 to 0.0015 inch). Such exemplary dimensions may be obtained, for example, by forming a mold for the seal 100 wherein the arcuate segment 116 for the first lip portion 104 is first cut or formed in the mold with a first tool and then the arcuate segment 124 of the protrusion 118 is cut or formed in the mold using a second, sharper tool.

Still referring to FIG. 2C, the protrusion 118 may be strategically configured and located relative to the first lip portion 104. For example, it may be desirable to orient the first segment 120 of the protrusion 118 such that it is substantially perpendicular with the second segment 114 of the first lip portion 104. It may also be desirable to configure the protrusion 118 such that the second segment 122 of the protrusion 118 forms an acute angle relative to the second segment 114 of the first lip portion 104. The acute angle formed by the second segment 122 of the protrusion 118 acts as a base to stabilize the protrusion 118 such as, for example, during axial reciprocation of a machine element relative thereto.

Furthermore, it may be desirable to position the protrusion 118 such that the first segment 120 thereof adjoins with the arcuate segment 116 of the first lip portion 104. For example, the first segment 120 of the protrusion 118 may be located upstream (e.g., nearer to the first segment 112 of the first lip portion 104) from the projected transition 125 between the second segment 114 and the arcuate segment 116 of the first lip portion 104 (indicated with dashed lines) a distance "D" of approximately 2 mils (0.002 inch).

Also, it may be desirable to configure the protrusion 118 to project outwardly a specified distance from the first lip portion 104. For example, the protrusion may project a distance "X" of approximately 0.75 to 1.5 mils (0.00075 to 0.0015 inch) in a direction which is substantially perpendicular from the second segment 114 of the first lip portion 104.

It is noted that the location and configuration of the protrusion 118 may vary from the examples set forth above. For example, the first segment 120 of the protrusion 118 may be located to be substantially even with and adjoining, or even positioned slightly behind, the projected transition 125 between the second segment 114 and the arcuate segment 116 of the first lip portion 104.

Figure 3:
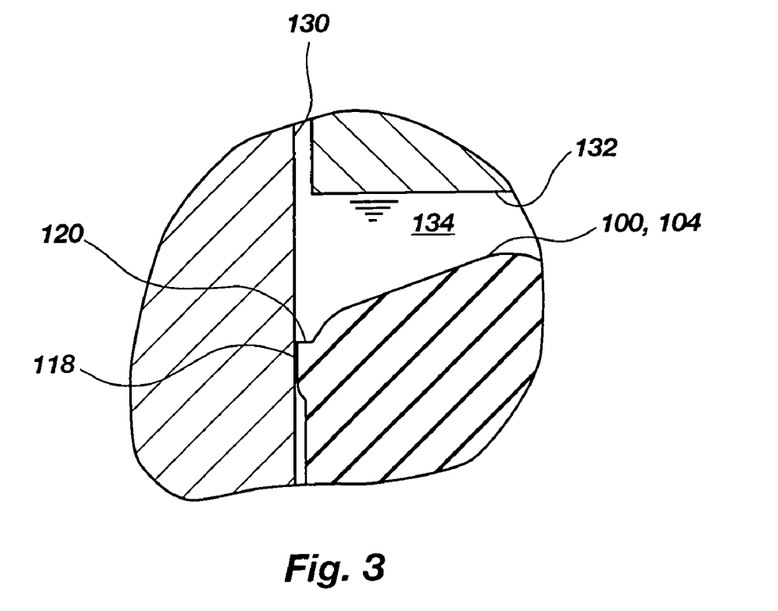
FIG. 3 is a cross-sectional view of the lip seal of FIG. 2A disposed between two relatively movable machine components.

Referring now to FIG. 3, the seal 100 is shown installed between a first machine element 130 and a second machine element 132 in a manner similar to that previously described with respect to FIGS. 1A and 1B. It is noted that, when installed between the two machine components, the first lip portion 104 is compressed slightly inwardly by the first machine element 130 as the protrusion 118 contacts a surface thereof. It is further noted that the protrusion 118 is configured and oriented with respect to the first machine element 130 such that the first segment 120 of the protrusion 118 defines a substantially perpendicular interface angle as it contacts the surface of the first machine element 130. Such a configuration and orientation provides a relatively high contact force and reduces the contact area in comparison with a prior art seal not having a similarly configured protrusion. The increased contact force over a reduced area, as well as the substantially perpendicular interface of the protrusion 118 with the fluid 134, serves to improve the ability of the seal 100 to penetrate the fluidic film (not shown) which conventionally develops on the first machine element 130. Furthermore, a seal configured in accordance with the present invention also provides reduced leakage between two relatively movable machine elements in comparison with prior art seals.

Figure 4:
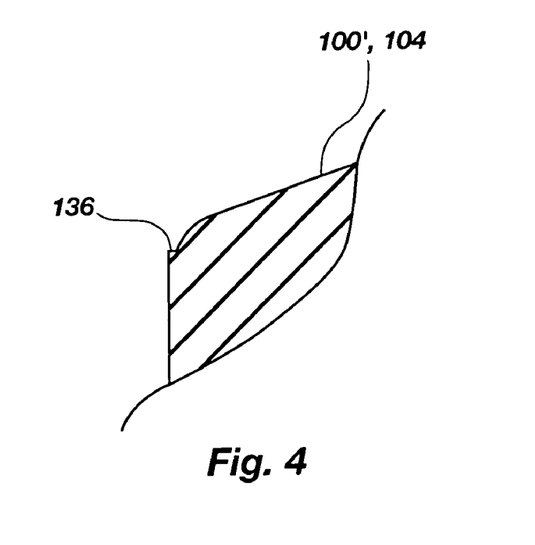
FIG. 4 is an enlarged cross-sectional view of the seal of FIG. 3 after use and wear of the seal.
Figure 5A:
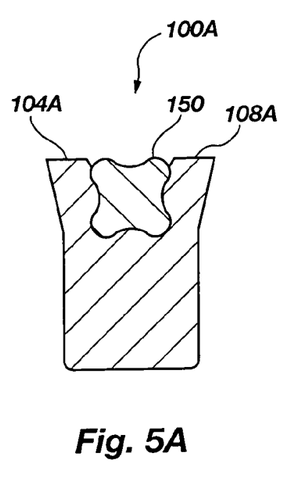
FIGS. 5A–5F show additional exemplary configurations of lip-type seals which may be used in accordance with the present invention.
Figure 5B:
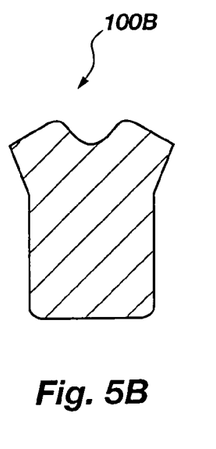
Figure 5C:
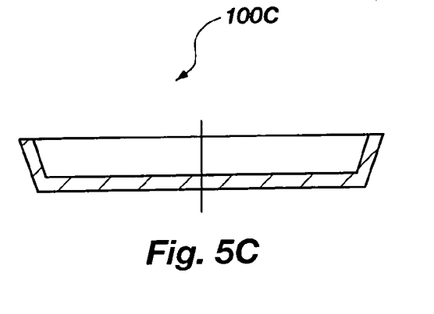
Figure 5D:
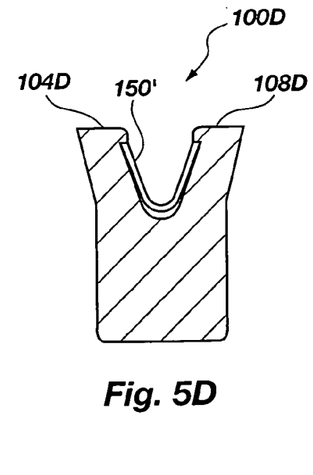
Figure 5E:
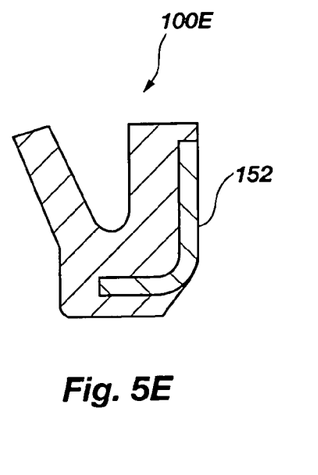
Figure 5F:
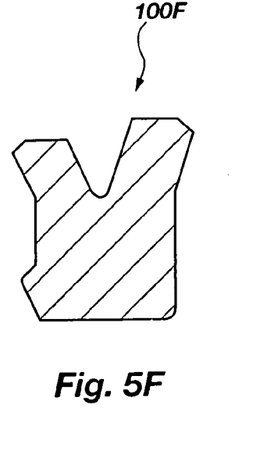

The configuration and orientation of the protrusion 118 further allows for an improved fluid seal even after substantial wear of the seal 100, and more particularly, wear of the protrusion 118, has occurred. For example, referring to FIG. 4, a cross-sectional view of the seal 100' is shown after use and wear has been experienced. While the protrusion 118 has significantly worn away, a small ridge 136 remains which still retains the desirable feature of being substantially perpendicular to the surface of a machine element (not shown in FIG. 4 for clarity) when installed and in contact therewith. The perpendicular relationship between the ridge 136 and the surface of the machine element again helps to penetrate any fluidic films formed thereon. Thus, the present invention not only provides an improved seal when initially installed but also provides for improved performance over and increased life of the seal 100.

Referring now to FIGS. 5A–5F, as mentioned above, the present invention may be incorporated into seals 100A–100F of various shapes and configurations. Such seals may include, for example, various garter-type springs 150 and 150' disposed between the first lip portions 104A and 104D and second lip portions 108A and 108D, respectively. Similarly, other seal components such as backing or retaining-type members 152 may be incorporated into such seals 100A–100F as may be desired, depending on intended application and service thereof.

EXAMPLE

As set forth above, a seal configured in accordance with the present invention reduces leakage between two movable machine elements in comparison with prior art seals. In a test performed on a seal configured according to the present invention, leakage was determined to be reduced by an average of approximately 71%.

More specifically, two groups of seals were tested wherein the first group of seals included four seals configured as substantially described with respect to FIGS. 1A and 1B, having a 0.004 inch radius at the leading edge of the lip and without a protrusion formed at or near the lip portion of the seal. This first group served as a control group.

The second group of seals included four seals configured in accordance with the present invention such as described with respect to FIGS. 2A–2C and FIG. 3, having a protrusion formed thereon. Both groups of seals were formed as a "U-cup" type seal formed of a polyurethane material.

The seals were disposed in contact with a surface of a first machine element and within an annular groove, or a gland, of a second machine element in a manner similar to that described with respect to FIG. 1B and FIG. 3 above herein. The first machine element was a cylindrical shaft which was axially displaceable relative to the second machine element. One side of the formed seal between the two relatively movable machine elements had a pressurized vessel of petroleum-based hydraulic oil. The open end of the "U-cup" configuration of the seals was disposed toward the pressurized side. A wiper seal was placed on the downstream, or nonpressurized, side of the seals to prevent dust or other particle contaminants from entering the vessel. The external side of the wiper seal was exposed to the ambient air.

During each test, the cylindrical shaft, or first machine element, was displaced away from the pressurized vessel a distance of 6 inches at a velocity of 94 feet per minute (ft/min), relative to the second machine element, while the vessel gauge pressure was less than 50 pound per square inch (psi). The shaft, or first machine element, was then displaced toward the pressurized vessel a distance of 6 inches (back to its original position) at a velocity of 94 ft/min, again relative to the second machine element, with the vessel gauge pressure at approximately 2,000 psi. The displacement and subsequent return of the first machine element was considered a single cycle.

Each shaft was subjected to 25,000 cycles in accordance with the above-described process. Any hydraulic oil which escaped the exterior of the vessel through the seal was collected and weighed on a gram scale. The average leakage for the control group of seals was 4.66 grams of hydraulic oil. The average leakage for the seals configured in accordance with the present invention was 1.35 grams of hydraulic oil.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention includes all modifications, equivalents, and alternatives falling within the spirit and scope of the invention as defined by the following appended claims.

What is claimed is:

1. A seal comprising:
a substantially annular body portion;
a substantially annular lip portion extending from the body portion, the lip portion having an arcuate segment which exhibits a first radius, a first segment adjoining the arcuate segment of the lip portion on a first side thereof and a second segment adjoining the arcuate segment of the lip portion on a second side thereof; and
a substantially annular protrusion formed on the lip portion having an arcuate segment which exhibits a second radius which is less than the first radius, the protrusion further including a first segment adjoining the arcuate segment of the protrusion on a first side thereof and wherein the first segment of the protrusion is also adjacent the arcuate segment of the lip portion, wherein the protrusion is configured to contact a surface of a relatively movable machine element and wherein the first segment of the protrusion is configured to be substantially perpendicular with the surface of the relatively movable machine element upon contact therewith, and wherein the substantially annular protrusion projects in a direction substantially perpendicular to the second segment of the lip portion beyond any surface features of the second segment of the lip portion.

2. The seal of claim 1, wherein the second radius is less than approximately 0.004 inch.

3. The seal of claim 1, wherein the first segment of the protrusion is substantially perpendicular to the second segment of the lip portion.

4. The seal of claim 1, wherein the protrusion further includes a second segment adjoining the arcuate segment of the protrusion on a second side thereof and wherein the second segment of the protrusion is also adjacent the second segment of the lip portion.

5. The seal of claim 4, wherein the second segment of the protrusion is oriented at an acute angle with respect to the second segment of the lip portion.

6. The seal of claim 1, wherein the first segment of the protrusion is displaced a predetermined distance from a projected transition between the second segment of the lip portion and the arcuate segment of the lip portion towards the first segment of the lip portion.

7. The seal of claim 6, wherein the predetermined distance is approximately 0.002 inch.

8. The seal of claim 1, wherein the distance the protrusion projects in the direction substantially perpendicular to the second segment of the lip portion is approximately 0.00075 to 0.0015 inch.

9. The seal of claim 1, wherein the first radius is approximately 0.004 inch and the second radius is approximately 0.00075 to 0.0015 inch.

10. A seal comprising:
a substantially annular body portion;
at least one substantially annular lip portion extending from the body portion, the at least one lip portion having an arcuate segment which exhibits a radius of approximately 0.004 inch, a first segment adjoining the arcuate segment of the at least one lip portion on a first side thereof and a second segment adjoining the arcuate segment of the at least one lip portion on a second side thereof; and
a substantially annular protrusion formed on the at least one lip portion having an arcuate segment which exhibits a radius of approximately 0.00075 to 0.0015 inch, and a first segment adjoining the arcuate segment of the protrusion on a first side thereof wherein the first segment of the protrusion is also adjacent the arcuate segment of the at least one lip portion and wherein the first segment of the protrusion is substantially perpendicular to the second segment of the at least one lip portion, and wherein the first segment of the protrusion is displaced a distance of approximately 0.002 inch or less from a projected transition between the second segment of the at least one lip portion and the arcuate segment of the at least one lip portion towards the first segment of the at least one lip portion, and wherein the substantially annular protrusion projects in a direction substantially perpendicular to the second segment of the lip portion beyond any surface features of the second segment of the lip portion.

11. A seal comprising:
a substantially annular body portion;
a substantially annular lip portion extending from the body portion having a first segment and a second segment angularly disposed relative to the first segment; and
a substantially annular protrusion formed on at least a portion of the second segment of the lip portion, the protrusion including a first segment joined with an arcuate segment wherein the first segment of the protrusion is substantially perpendicular with the second segment of the lip portion, and wherein the substantially annular protrusion projects in a direction substantially perpendicular to the second segment of the lip portion beyond any surface features of the second segment of the lip portion, wherein the first segment of the lip portion and the first segment of the protrusion are located on an intended fluid side of the seal, and wherein the first segment of the lip portion and the second segment of the lip portion are joined by an arcuate segment.

12. The seal of claim 11, wherein the protrusion adjoins both the arcuate segment of the lip portion and the second segment of the lip portion.

13. The seal of claim 12, wherein the first segment of the protrusion is displaced a distance of approximately 0.002 inch from a projected transition between the second segment of the lip portion and the arcuate segment of the lip portion towards the first segment of the lip portion.

14. The seal of claim 11, wherein the distance the protrusion projects in the direction substantially perpendicular to the second segment of the lip portion is approximately 0.00075 to 0.0015 inch.

15. The seal of claim 11, wherein the arcuate segment of the protrusion exhibits a radius of less than approximately 0.004 inch.

16. The seal of claim 11, wherein the protrusion further includes a second segment adjoining the arcuate segment of the protrusion and wherein the second segment of the protrusion is also adjacent the second segment of the lip portion.

17. The seal of claim 16, wherein the second segment of the protrusion is oriented at an acute angle with respect to the second segment of the lip portion.

18. An apparatus comprising:
a first machine element;
a second machine element, wherein the first machine element and the second machine element are relatively movable with respect to each other; and
a seal disposed between and in contact with the first machine element and the second machine element, the seal comprising:
a substantially annular body portion,
at least one substantially annular lip portion extending from the body portion, the at least one lip portion having an arcuate segment which exhibits a first radius, a first segment adjoining the arcuate segment of the lip portion on a first side thereof and a second segment adjoining the arcuate segment of the lip portion on a second side thereof; and
a substantially annular protrusion formed on the at least one lip portion having an arcuate segment which exhibits a second radius which is less than the first radius, the protrusion further including a first segment adjoining the arcuate segment of the protrusion on a first side thereof and wherein the first segment of the protrusion is also adjacent the arcuate segment of the lip portion, wherein the protrusion is in contact with a surface of the first machine element and wherein the first segment of the protrusion is substantially perpendicular with the surface of the first machine element, and wherein the substantially annular protrusion projects in a direction substantially perpendicular to the second segment of the lip portion beyond any surface features of the second segment of the lip portion.

19. The apparatus of claim 18, wherein the first segment of the protrusion is substantially perpendicular to the second segment of the at least one lip portion.

20. The apparatus of claim 19, wherein the protrusion further includes a second segment adjoining the arcuate segment of the protrusion on a second side thereof and wherein the second segment of the protrusion is also adjacent the second segment of the at least one lip portion.

21. The apparatus of claim 20, wherein the second segment of the protrusion is oriented at an acute angle with respect to the second segment of the at least one lip portion.

22. The apparatus of claim 18, wherein the first segment of the protrusion is displaced a predetermined distance from a projected transition between the second segment of the at least one lip portion and the arcuate segment of the at least one lip portion towards the first segment of the at least one lip portion.

23. The apparatus of claim 22, wherein the predetermined distance is approximately 0.002 inch.

24. The apparatus of claim 18, wherein the protrusion projects outwardly relative to the second segment of the at least one lip portion a distance of approximately 0.00075 to 0.0015 inch.

25. The apparatus of claim 18, wherein the first radius is approximately 0.004 inch and the second radius is approximately 0.00075 to 0.0015 inch.

26. The apparatus of claim 18, wherein contact between the relatively movable machine element and the seal consists essentially of contact with the protrusion.

27. An apparatus comprising:
a first machine element;
a second machine element, wherein the first machine element and the second machine element are relatively movable with respect to each other; and
a seal disposed between and in contact with the first machine element and the second machine element, the seal comprising:
a substantially annular body portion;
a substantially annular lip portion extending from the body portion having a first segment and a second segment angularly disposed relative to the first segment; and
a substantially annular protrusion formed on at least a portion of the second segment of the lip portion, the protrusion including a first segment joined with an arcuate segment wherein the first segment of the protrusion is substantially perpendicular with the second segment of the lip portion, and wherein the substantially annular protrusion projects in a direction substantially perpendicular to the second segment of the lip portion beyond any surface features of the second segment of the lip portion, wherein the first segment of the lip portion and the first segment of the protrusion are located on an intended fluid side of the seal, and wherein the first segment of the lip portion and the second segment of the lip portion are joined by an arcuate segment.

28. The apparatus of claim 27, wherein the protrusion is disposed on both the arcuate segment of the lip portion and the second segment of the lip portion.

29. The apparatus of claim 28, wherein the first segment of the protrusion is displaced a distance of approximately 0.002 inch from a projected transition between the second segment of the lip portion and the arcuate segment of the lip portion towards the first segment of the lip portion.

30. The apparatus of claim 29, wherein the protrusion projects outwardly relative to the second segment of the lip portion a distance of approximately 0.00075 to 0.0015 inch.

31. The apparatus of claim 27, wherein the arcuate segment of the protrusion exhibits a radius of less than approximately 0.004 inch.

32. The apparatus of claim 27, wherein the protrusion further includes a second segment adjoining the arcuate segment of the protrusion and wherein the second segment of the protrusion is also adjacent the second segment of the lip portion.

33. The apparatus of claim 32, wherein the second segment of the protrusion is oriented at an acute angle with respect to the second segment of the lip portion.

34. The apparatus of claim 27, wherein contact between the relatively movable machine element and the seal consists essentially of contact with the protrusion.

35. A method of forming a seal between a first machine element and a second machine element which is movable relative to the first machine element, the method comprising:

providing a sealing member having a body portion, a lip portion extending from the body portion having a first segment, a second segment and an arcuate segment positioned between and adjoining the first and second segments of the lip portion, and a protrusion formed on the lip portion, wherein the protrusion has at least a first segment adjoined with an arcuate segment;

disposing the sealing member between the first machine element and the second machine element including contacting a surface of the first machine element with the protrusion such that the at least a first segment of the protrusion is substantially perpendicular with the surface of the machine element; and moving the first machine element relative to the sealing member while maintaining contact therebetween so as to wear a substantial volume of the protrusion away, thereby leaving a ridge segment between the second segment of the lip portion and the arcuate segment of the lip portion which is substantially perpendicular to the surface of the first machine element.

\* \* \* \* \*